April 9, 1935. G. B. POLLOCK 1,997,266
FILM MOVEMENT
Filed Dec. 15, 1931 2 Sheets-Sheet 1
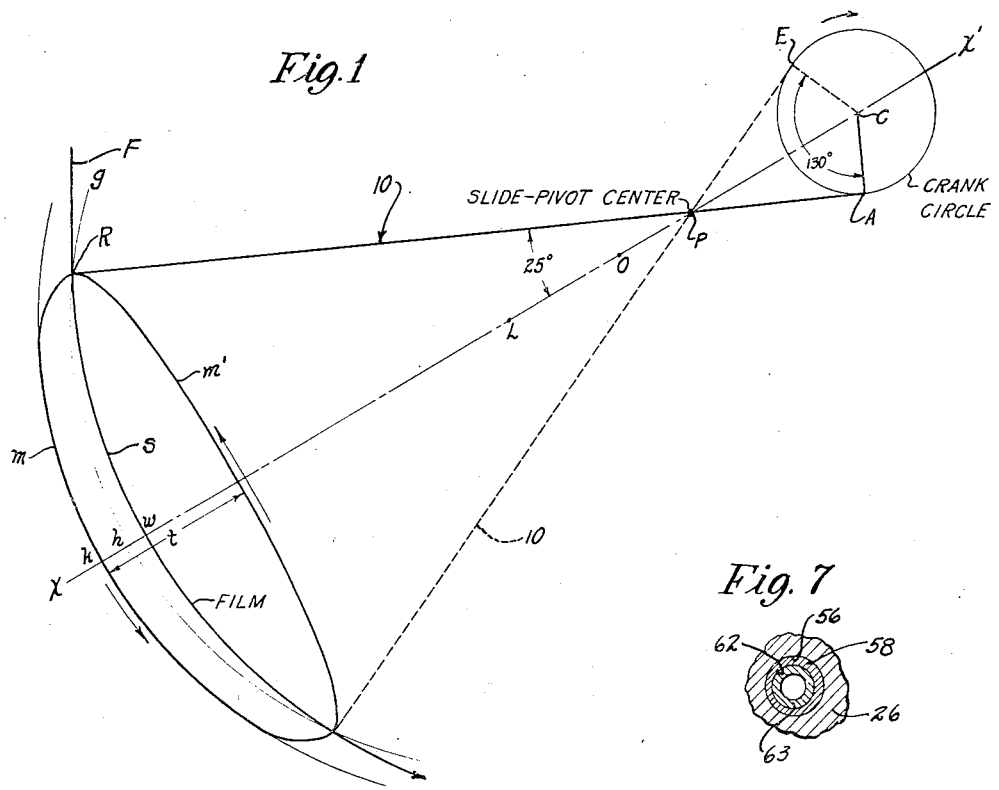
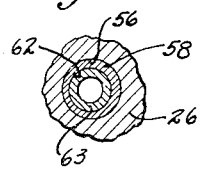
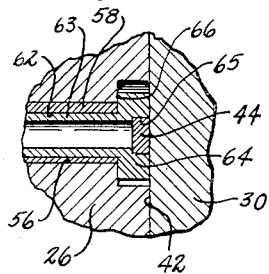
Inventor
Gordon B. Pollock.
Attorney.

April 9, 1935. G. B. POLLOCK 1,997,266
FILM MOVEMENT
Filed Dec. 15, 1931 2 Sheets-Sheet 2
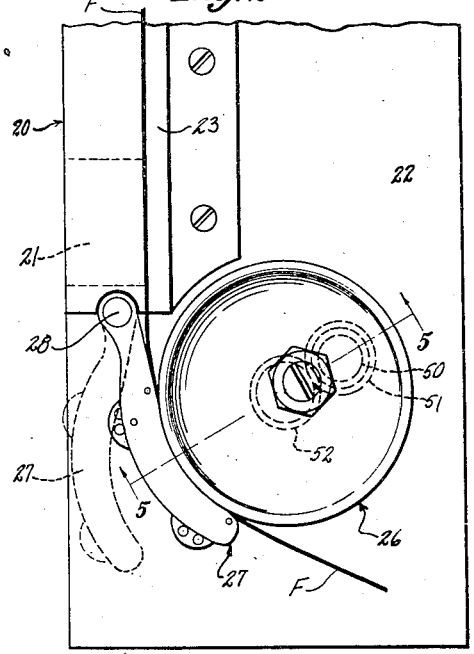
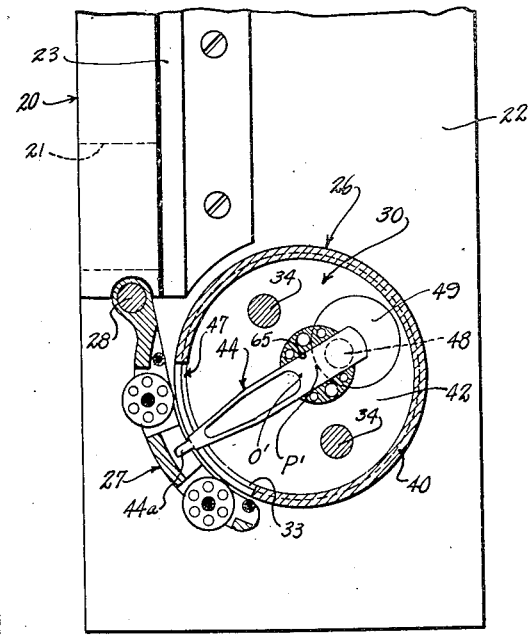
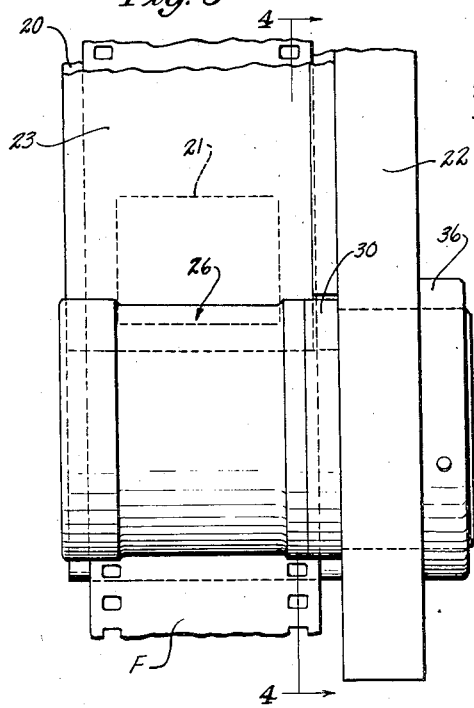
Inventor
Gordon B. Pollock.
Attorney.

UNITED STATES PATENT OFFICE 1,997,266

FILM MOVEMENT

Gordon B. Pollock, Los Angeles, Calif.

Application December 15, 1931, Serial No. 581,155

20 Claims. (Cl. 88—18.4)

This invention relates generally to intermittent film movement mechanisms for motion picture cameras and the like, and more particularly to that type of movement which may be described generally as involving an oscillative claw arm driven from its rear end by a crank or equivalent element and constrained intermediate its ends by a slide-pivot guide; and it may be stated as a general object of the invention to provide an improved film movement of the type thus characterized. It is to be understood, however, that certain features of the invention are not limited in applicability to that particular claw arm arrangement, and such features are therefore not to be considered as restricted to combination with said claw arm arrangement except when so claimed.

Film movements of the type referred to above are recognized to have the important advantages of simplicity and freedom from excessive wearing and noise making parts; but unless the relative proportions of the parts are within certain definite limits which I have ascertained, the characteristics of the motion path of the claw pin are undesirable from several standpoints. Among the disadvantages encountered may be mentioned, first, excessive "sawing" of the claw pin on the edges of the film perforations during movement of the film. This condition not only causes wear on the perforations and occasional actual tearing of the film, but also results in the emulsion on the film being scraped off by the claw pin and accumulating on the pin and within the film race, to obvious disadvantage. Another disadvantageous condition usual in this type of mechanism is excessive angularity in the direction of the claw pin and its movement in engaging and disengaging the film, in contradistinction to claw pin movement substantially normal to the film during engagement and disengagement therewith. Largely for the above disabilities, among other factors which will be mentioned hereinafter, this type of movement has not been to any extent utilized in the art, notwithstanding its superior characteristics as regards simplicity and quietness.

I have found, however, that when certain proportions and dimensions of this type of movement are within certain definite limits, herein described, the disadvantageous characteristics above referred to may be so reduced as to become entirely unobjectionable in practice. When the movement is to be embodied in accordance with the proportions and dimensions to which I refer, however, certain difficulties hereinafter made apparent immediately arise in the provision of a mechanical design and structure which will give the claw arm and its driving crank and slide-pivot guide adequate strength and support; and it may be largely due to these mechanical difficulties that no movement has appeared in the art having the improved proportions and accompanying desirable characteristics of the movement herein described. Certain features of my invention therefore relate to a novel design and construction capable of embodying the novel claw arm proportions described.

The invention itself will be made apparent from the following detailed description of a present preferred embodiment, from which the various specific objects and accomplishments thereof will readily appear, reference for this purpose being had to the accompanying drawings, in which:

Fig. 1 is a diagram illustrating the motion characteristics of a movement designed in accordance with my invention;

Fig. 2 is a side elevation of the movement;

Fig. 3 is an elevation of the movement looking from the right in Fig. 2.

Fig. 4 is a section taken on line 4—4 of Fig 3;

Fig. 5 is a section taken on line 5—5 of Fig. 2;

Fig. 6 is a detail section taken on line 6—6 of Fig. 5; and

Fig. 7 is a detail section taken on line 7—7 of Fig. 5.

Before proceeding to a description of the mechanical design of the present movement, I shall describe the essential proportions to which I have found the movement must conform in order that it will have the operating characteristics desired. For this purpose reference is first directed to Fig. 1, in which the movement is indicated in simplified diagram.

In Fig. 1 numeral 10 designates the oscillative claw arm. This claw arm has at its forward end R (left hand end in Fig. 1) a claw pin adapted for engagement with the film perforations. The rear end of the arm is driven by an eccentric or crank of suitable throw, the crank pin being here indicated at A, and the center of the crank being designated at C. The arm is guided at a proper location between its ends by a slide-pivot P— for instance, a pivot through or on which the claw arm slides. The center line of the movement is indicated as X—X', and includes slide pivot point P. When the crank is rotated in a right handed direction, the claw pin on the forward end of the arm describes a certain motion path $m$—$m'$, as indicated, and the shape and characteristics of this pin path are governed by the diameter of the crank circle, and the length and angularity of the claw arm, as will be described more fully hereinafter.

The film F is arranged to be guided through the motion path of the claw arm in a curved film path s, as indicated. At the upper limit of its movement the claw arm advances its claw pin into engagement with a film perforation, after which the arm moves the pin to draw the film through the "pull-down" distance, then retracts to withdraw the pin from engagement with the film, and finally carries the pin through the return path into the first position. Now it is important that the claw pin move as nearly as possible in directions normal to the film when engaging and disengaging therewith, as is well understood in the art. And if the film were to be bent into an arc whose center coincided with the slide-pivot P, this desired condition would obviously be obtained exactly. However, it is desirable from the standpoint of reducing relative movement or "saw" of the claw pin in the film perforations that the film be bent into an arc of somewhat shorter radius, so as to conform more closely to the pull down path m of the claw pin. An arc g—h may be drawn through the end of the claw arm when the arm is in its uppermost position, and with a center L on center line X—X' such that the arc follows as closely as possible the curvature of the pull-down path m and it will be apparent that this arc g—h is the theoretical film path for minimum saw, the amount of saw here being equal to distance h—k. At this extreme, however, the film is not in a position such that the direction lines of entrance and withdrawal of the claw pin are sufficiently close to normal with respect to the film for best operation. I have found that the best overall characteristics are obtained when the center of the film path is fixed at a compromise point O somewhere between the slide-pivot P and the ideal center L for minimum saw. Its best position, as I have determined, is in a substantially medial position between points L and P. This preferred center O gives a film path s resulting in a saw equal to w—k, which is not too great, and gives a film entrance and withdrawal angle for the claw pin which is sufficiently close to a perfect normal for all practical purposes.

The above discussion regarding the design of the film path is made with the assumption that the claw arm size and proportions were previously determined or known. The exact claw arm dimensions cannot be determined, however, until the film path is laid out; but, known from reasoning such as the above the general characteristics required of the motion path of the claw pin, the claw arm proportions may be designed with reference to an approximate film path curve of the exact pull down length required (.748 inches for present standard film), after which slight design adjustments in the length of the claw arm will take care of design adjustments subsequently found necessary in the curvature of the film path.

Thus assuming the film path s to be laid out on an arc having a center on axis X—X' and a radius giving the approximate path required, and assuming the constant pull down length (.748 inch) to be marked out, the next step is to design the exact size, proportions and position of the claw arm. To do this, a line 10 to represent the claw arm is drawn from the upper end of the pull down arc s through a pivot point P on axis X—X'. Now the angular position of this claw arm line (or in other words the location of pivot point P through which the arm is guided) determines the number of degrees of revolution of the crank during which the pull-down will take place, as will become apparent from what follows. It will be noted, for example, that in the two extreme claw arm positions, illustrated in full and dotted lines, the claw arm is tangent to the crank circle, and it will be apparent that the angular distance between said tangent positions is the measure of the pull down period of the movement, irrespective of the diameter of the crank circle. Now the angular distance between the points of tangency A and E, which measure thus corresponds to the duration of the pull down, depends directly upon the location of pivot point P—the closer this pivot point is moved towards the film, the smaller being the angular distance between tangent points A and E, and hence the smaller being the duration of the pull down. And, obviously, this is true regardless of the diameter of the crank. Therefore, pivot point P is located to give a pull down corresponding to the proper number of degrees of revolution of the crank, and the maximum practical limit of the pull down in any film movement for a motion picture camera is usually taken as approximately 160°. However, it is usually desirable to reduce the pull down below this value, and in the movement herein diagrammed and illustrated the parts are proportioned to give a pull down of approximately 130°, which is substantially lower than is possible in many other types of movement mechanism.

Having chosen the location of pivot point P, it remains to determine the diameter of the crank. Now it will be apparent that the width t of the claw pin path diagram m, m' on axis X—X' is equal to the diameter of the crank circle, and this throw must be sufficient to permit a positive engagement and disengagement of the claw pin with the film. However, the smaller the crank circle (and therefore the claw arm length AP for a given claw arm length PR), the more ideal becomes the claw pin path from a number of standpoints, among which may be mentioned, first, that the claw pin path m more nearly conforms to a true arc, and second, that the ideal center L of the arc gh of minimum saw (drawn to conform to the claw pin path m) approaches the sliding pivot point P. This result means a reduction of saw, which permits the center O of the film path arc s to be located more closely to P so as to obtain a more nearly perpendicular or normal entrance and withdrawal for the claw pin, while still holding the saw below undesired values.

Speaking from the standpoint of motion characteristics only, it is therefore generally desirable to make the crank throw as small as is possible, limited only by providing sufficient throw to insure positive engagement and disengagement of the film by the claw pin. Considerations of strength of materials and structural design, however, set a practical minimum limit on the diameter of the crank, as will appear.

I may here give preferred controlling dimensions for a standard pull-down of .748", as determined by adherence to the characteristics of the diagram of Fig. 1. The center line of the claw-arm may be arranged to be at an angle of approximately 25 degrees to the center line of the movement when the arm is in its uppermost position (Fig. 1). Then, utilizing a crank of a radius of .1127", the center of the crank falls at a point spaced approximately .2695" from the center of the slide-pivot point P, and the ratio of arm length AP to arm length PR when the arm is at the upper limit of the pull-down stroke is approximately 1 to 3½, increasing to approximately 1 to 5½ at the midpoint of the pull-down. The center of the film path arc may then be taken at a point spaced .1175" from point P. It is to be understood, however, that while I give exact dimensions of a present preferred embodiment, these dimensions may be varied somewhat without nullifying attainment of the advantageous characteristics of the movement of the present invention.

The movement which I have designed to embody the above described proportions and characteristics is illustrated in Figs. 2 to 7, wherein the movement is shown to 1½ scale. The movement is shown independent of any pilot pin or pressure plate arrangements, since any approved film holding means may be incorporated therewith. Reference is directed, however, to my copending application entitled Pressure plate for film movement mechanism, filed Dec. 15, 1931, Ser. No. 581,156, wherein film holding mechanism particularly adapted but not limited to the present movement is described. In the figures numeral 20 designates a vertical aperture plate having an exposure aperture 21 and numeral 22 designates a vertical frame plate arranged at right angles to and extending rearwardly from an edge of plate 20. Spaced rearwardly from aperture plate 20 and extending from frame plate 22 is a guide plate 23, and between said guide plate and the aperture plate is formed the guide way for the film F. From the lower end of said guide way the film passes down and around a cylindrical guide surface formed on the periphery of a cylinder 26, the cylinder being recessed at 26a to clear the action area of the film. This cylinder (which encloses the film moving arm) is mounted with its axis horizontal and at right angles to plate 22, and is positioned with its left hand side below the film guide, as shown. The curvature of guide surface 25 on the cylinder determines the film path s through the movement, and the center O' of cylinder 26 therefore corresponds to center O in the diagram of Fig. 1.

On the side of the film opposite said cylinder is a gate 27 of any approved form, the gate here shown being similar to that described in my copending application entitled "Gate for film movement mechanism", filed Dec. 15, 1931, Ser. No. 581,157. For convenience in threading the film through the movement, gate 27 is pivoted at 28 so as to be capable of swinging back from operative position to the open position shown in Fig. 2 in dotted lines.

Cylinder 26 is mounted concentrically on a cylindrical carrier-block 30 of the same diameter, which in turn is mounted in a round opening 31 in plate 22. Cylinder 26 is provided at its inner end with an annular flange 32 that is received within an annular groove 33 in block 30, and is secured to block 30 as by screws 34. Block 30 has a shoulder 35 that comes against the front surface of 22, and its rear end is screw-threaded to take a nut 36 which is set up tightly to hold the block in proper position.

The inner end of cylinder 26 is formed with an annular flange 40, and this flange 40 and the parallel, opposed end-surfaces or walls 41 and 42 of cylinders 26 and 30, respectively, define an enclosed compartment for the oscillative claw arm 44. The claw arm is provided with flat, machined sides which work against and are laterally supported by surfaces 41 and 42, said surfaces being machined to provide smooth bearing for the arm. Flange 40 is cut away at 47 to permit the forward end of the claw arm to reach the film, and the forward end of said arm is provided with a film engaging claw pin 44a of proper size to fit nicely in the film perforations.

The rear end of arm 44 has an inwardly extending crank pin 48 driven by a crank disk 49 on the end of a drive shaft 50, crank disk 49 and drive shaft 50 being journalled in carrier block 30, as clearly shown in Fig. 5. Shaft 50 is shown provided with a gear 51 meshing with a gear 52 on a drive shaft 53 whose axis is concentric with that of cylindrical block 30, this arrangement permitting block 30 to be rotatably adjusted in frame plate 22 while maintaining gear 51 in proper mesh with the gear 52 on the fixed axis of shaft 53, as will be readily understood.

Attention is here called to the fact that the proportions utilized in designing the movement (discussed in connection with Fig. 1) result in a claw arm of such length as to permit the driving crank 49 to be just within the circle of cylinder 26, which circle is substantially a continuation of the arc of the film path; and it is in consequence of this fact that the movement can be conveniently and compactly mounted entirely within said cylinders 26 and 30, whose circular peripheral surface is formed to conform to the arc of the film path and serves as a film guide.

Difficulty in the mechanical design of the movement ensues from the close proximity of the slide-pivot point P (shown at P' in Fig. 4) to the crank pin, as dictated by the theoretical diagram of Fig. 1, since a slide-pivot guide of a size sufficient for adequate strength overlaps and interferes with the crank pin when the centers of the two are spaced in accordance with said diagram. The manner in which I have obviated these difficulties will be apparent from the following description of the preferred slide-pivot guide: Cylinder 26 is drilled from its inner end with a bore 55, and with reduced bores 56 and 57 respectively, as shown in Fig. 5. Mounted to rotate in bore 56 is a sleeve or bushing 58, which has a reduced screw-threaded portion 59 extending through reduced bore 57. A nut 60 threaded on portion 59 is set up against the outer end of cylinder 26 to secure the bushing in position. Bushing 58 has a bore 62, preferably eccentrically located with reference to the central bushing axis (see Fig. 7), and mounted to oscillate in said bore 62 is a pivot member comprising a sleeve 63 having a head 64 cut with a guide slot 65 for claw arm 44 (see Fig. 6), said head working between and having lateral bearing on shoulder 66 and surface 42 of member 30.

In the operation of claw arm 44 by crank 49, the rear or crank end of the arm is moved around in a circle, and the arm slides back and forth in the slotted head of the pivot member, which member pivots in bushing 58 to accommodate the oscillatory motion of the arm, it being understood that the axis P' of said pivot member corresponds to point P in Fig. 1. The characteristics of the motion of the claw arm have previously been described in connection with Fig. 1, and will now be understood without further discussion.

It will be remembered that pivot bore 62 is located eccentrically in bushing 58, and it is therefore possible, by rotative adjustment of bushing 58, to adjust the location of slide-pivot point P around in a small circle equal in radius to the amount of eccentricity. For the purpose of this adjustment, the outer end of the screw-threaded portion 59 of the sleeve may be provided, for instance, with a slot 70, so that after nut 69 has been loosened a screw driver can be used to rotate the bushing. Since the location of point P determines the duration of the pull down, the other characteristics of the motion, this provision makes possible fine adjustments of those characteristics.

Another adjustment which may here be mentioned is the capability for rotative movement of block 30 in wall 22, which provides for a bodily shift of the whole movement in such a manner as to shift the claw movement in either direction along the line of the film path. And since the driving gear 52 is always on the axis of the cylinder, it stays in proper mesh with gear 51 during such adjustment.

The moving parts of the mechanism are small and light, which is conducive to absence of troubles from unbalance of quickly accelerating parts. And what little vibration there is in the mechanism is very largely absorbed in the heavy blocks which enclose and support the whole movement. Further, the mechanism being entirely enclosed, what little noise may be made by the mechanism is entirely muffled by the enclosure.

It will now be understood that I have ascertained and disclosed certain definite proportions and relationships which result in a film movement of greatly enhanced usefulness and practicability, and further that I have provided novel structure peculiarly adapted to the embodiment of said proportions and relationships. However, while I have illustrated and described certain specific means for carrying out an embodiment of my invention, it will be obvious that various changes in design, structure and arrangement may be effected without departing from the spirit and scope of my invention; and it is therefore to be understood that all such changes are contemplated within the scope of my invention as expressed in the following claims.

I claim:

1. In a film movement, the combination of a frame, a claw arm adapted at its forward end for engagement with a film, a drive shaft journalled in the frame exclusively on one side of said arm, a crank on the end of said shaft operating the rear end of said claw arm, and a slide-pivot guide for an intermediate section of the claw arm mounted in the frame exclusively on the side of the claw arm opposite the drive shaft, the distance between the centers of the crank and the slide-pivot being less than the sum of the radii of the crank and the slide-pivot.

2. In a film movement, the combination of a frame, a claw arm adapted at its forward end for engagement with a film, a drive shaft journalled in the frame exclusively on one side of said arm, a crank on the end of said shaft operating the rear end of said claw arm, and a guide for an intermediate section of the claw arm comprising a pivot head having a slot through which the claw arm slides, and a pivot member extending from said head at right angles to the arm and disposed exclusively on the side of the arm opposite the drive shaft, and means supporting said pivot member for pivotal movement, the distance between the centers of said pivot member and the crank being less than the sum of the radii of the crank and the slotted slide pivot head.

3. In a film movement, the combination of a claw arm adapted at its forward end for engagement with a film, said claw arm having flat parallel side surfaces parallel side walls defining a working space and forming lateral bearings for the side surfaces of said claw arm, and mechanism for oscillating the claw arm in a plane parallel to the side walls.

4. In a film movement, the combination of a claw arm adapted at its forward end for engagement with a film, a pair of parallel walls defining a working space and forming lateral bearings for said claw arm, a drive shaft extending through one of said walls, a crank on the end of said shaft driving said claw arm, and a guide member pivoted in the other of said walls slidingly supporting said claw arm.

5. In a film movement, the combination of a frame, a claw arm adapted at its forward end for engagement with a film, a pair of parallel walls defining a working space and forming lateral bearings for said claw arm, a drive shaft extending through one of said walls, a crank on the end of said shaft driving the rear end of said claw arm, and a guide member pivoted in the other of said walls and extending into the claw arm space between said walls to slidingly support an intermediate section of the claw arm.

6. In a film movement, the combination of a frame, a claw arm adapted at its forward end for engagement with a film, a pair of parallel walls defining a working space and forming lateral bearings for said claw arm, a drive shaft extending through one of said walls, a crank on the end of said shaft driving the rear end of said claw arm, a guide member pivoted in the other of said walls to slidingly support an intermediate section of the claw arm, and means for adjusting the location of the pivot axis of said guide member.

7. In a film movement, the combination of a frame, a claw arm adapted at its forward end for engagement with a film, said claw arm having flat, parallel sides, a pair of parallel walls providing bearings for the flat sides of said claw arm, a drive shaft extending through one of said walls, a crank on the end of said shaft driving said claw arm, and a guide member provided in the other of said walls slidingly supporting said claw arm.

8. In a film movement, the combination of a frame, a claw arm adapted at its forward end for engagement with a film, said claw arm having flat, parallel sides, a pair of parallel walls providing bearings for the flat sides of said claw arm, a drive shaft extending through one of said walls, a crank on the end of said shaft driving the rear end of said claw arm, and a guide member pivoted in the other of said walls and extending into the claw arm space between said walls to slidingly support an intermediate section of the claw arm.

9. In a film movement, the combination of a frame, a claw arm adapted at its forward end for engagement with a film, said claw arm having flat, parallel sides, a pair of parallel walls providing bearings for the flat sides of said claw arm, a drive shaft extending through one of said walls, a crank on the end of said shaft driving the rear end of said claw arm, and a guide member pivoted in the other of said walls and extending into the claw arm space between said walls to slidingly support an intermediate section of the claw arm, and means for adjusting the location of the pivot axis of said guide member in a direction longitudinally of said claw arm.

10. In a film movement, the combination of a frame, a claw arm adapted at its forward end for engagement with a film, a pair of parallel walls defining a working space and forming lateral bearings for the claw arm, a drive shaft extending through one of said walls, a crank on the end of said shaft driving said claw arm, and a guide for the arm comprising a slotted head through which a section of the arm slides and a pivot part extending into the wall on the side of the arm opposite the drive shaft, and a bushing in said last mentioned wall journalling said pivot part.

11. In a film movement, the combination of a frame, a claw arm adapted at its forward end for engagement with a film, a pair of parallel walls defining a working space and forming lateral bearings for the claw arm, a drive shaft extending through one of said walls, a crank on the end of said shaft driving said claw arm, a guide for the arm comprising a slotted head through which a section of the arm slides and a pivot part extending into the wall on the side of the arm opposite the drive shaft, and a bushing in said last mentioned wall having an eccentric bore within which said pivot part is journalled, said bushing being adjustably rotatable.

12. In a film movement, the combination of a frame having a part providing an aperture plate, a film movement carrier mounted on said frame, said carrier providing a curved guide surface over which the film from the aperture plate passes, a film moving arm mounted for operation on said carrier and projecting through said curved guide surface to engage the film thereon, operating and guiding means for said arm mounted on said carrier, and said carrier being adjustably movable in said frame to shift the position of the film moving arm in either direction along the film path.

13. In a film movement, the combination of a frame having a part providing an aperture plate, a film movement carrier mounted on said frame, said carrier providing a curved guide surface over which the film from the aperture plate passes, a film moving arm mounted for operation on said carrier and projecting through said curved guide surface to engage the film thereon, operating and guiding means for said arm mounted on said carrier, and said carrier being adjustably rotatable in said frame to shift the position of the film moving arm in either direction along the film path.

14. In a film movement, the combination of a movement carrying block having a cylindrical surface forming a film guide, said block adjustably movable about the axis of said cylindrical surface, a film moving arm mounted for operation on said block and projecting through an opening in said cylindrical surface to engage the film, means carried by said block for operating said arm, and an actuating shaft for said operating means concentric with the cylindrical surface of said block.

15. In a film movement, the combination of a cylindrical movement containing block, the cylindrical surface of said block forming a film guide, said cylindrical block adjustably rotatable about the axis of its cylindrical surface, a film moving arm mounted for operation within said block and projecting through an opening in said cylindrical surface to engage the film, means within said cylindrical block for operating said arm, and an actuating shaft for said operating means concentric with the cylindrical surface of said block.

16. In an intermittent film movement mechanism, a rotatable drive shaft, a crank on said drive shaft, a film moving arm driven from its rear end by said crank, said arm having at its forward end a film-perforation-engaging claw pin, a pivoted member forming an arm pivot on which an intermediate section of said arm slides, so that rotation of the crank by the drive shaft causes the claw pin on the arm first to advance and then move downwardly in a pull down path which is substantially the arc of a circle having a center on a center line of the movement determined by the center of rotation of the crank and the center of said arm pivot, and finally to retract and move through a return path spaced rearwardly from its pull-down path to reach the first position, and curved film guide means for guiding a film in a curved film path just rearwardly of the pull down path of the forward end of said claw-pin, the center of curvature of said film guide means being located on the center line of the movement forward of the arm pivot center and between the center of the arm pivot and the center of curvature of the pull-down path of the claw pin.

17. In an intermittent film movement mechanism, a rotatable drive shaft, a crank on said drive shaft, a film moving arm driven from its rear end by said crank, said arm having at its forward end a film-perforation-engaging claw pin, a pivoted member forming an arm pivot on which an intermediate section of said arm slides, so that rotation of the crank by the drive shaft causes the claw pin on the arm first to advance and then move downwardly in a pull down path which is substantially the arc of a circle having a center on a center line of the movement determined by the center of rotation of the crank and the center of said arm pivot, and finally to retract and move through a return path spaced rearwardly from its pull-down path to reach the first position, said arm pivot and crank being so located and proportioned that at the beginning of the pull down path the relation between the arm length from the crank to the arm pivot and the arm length from the arm pivot to the forward end of the arm is substantially in the ratio of 1 to 3½, and curved film guide means for guiding a film in a curved film path just rearwardly of the pull down path of the forward end of said claw-pin, the center of curvature of said film guide means being located on the center line of the movement forward of the arm pivot center and between the center of the arm pivot and the center of curvature of the pull down path of the claw pin.

18. In an intermittent film movement mechanism, a rotatable drive shaft, a crank on said drive shaft, a film moving arm driven from its rear end by said crank, said arm having at its forward end a film-perforation-engaging claw pin, a pivoted member forming an arm pivot on which an intermediate section of said arm slides, so that rotation of the crank by the drive shaft causes the claw pin on the arm first to advance and then move downwardly in a pull down path which is substantially the arc of a circle having a center on a center line of the movement determined by the center of rotation of the crank and the center of said arm pivot, and finally to retract and move through a return path spaced rearwardly from its pull-down path to reach the first position, said arm pivot and crank being so located and proportioned that at the beginning of the pull down path the arm makes an angle of approximately 25° with the center line of the movement and the relation between the arm length from the crank to the arm pivot and the arm length from the arm pivot to the forward end of the arm is substantially in the ratio of 1 to 3½, and means for guiding a film in a curved film path just rearwardly of the pull down path of the forward end of said claw-pin, the center of curvature of said film path being located on the center line of the movement forward of the arm pivot center and between the center of the arm pivot and the center of curvature of the pull down path of the claw pin.

19. In a film movement, the combination of a claw arm adapted at its forward end for engagement with a film, a frame embodying a pair of parallel walls parallel to the plane of motion of the claw arm and defining a working space for said claw arm, a rotatable drive shaft supported exclusively on one of said walls, a crank on the end of said drive shaft operating on the claw arm, and a pivot member having a slot in its end through which the claw arm slides, said pivot member journalled exclusively in the wall on the side of the claw arm that is opposite the crank supporting wall and its slotted end terminating inside the plane of the claw arm that is on the side of the crank, the distance between the centers of the crank and the pivot member being less than the sum of the radii of the crank and the pivot member.

20. In an intermittent film movement mechanism, a rotatable drive shaft, a crank on said drive shaft, a film moving arm driven from its rear end by said crank, said arm having at its forward end a film-perforation-engaging claw pin, a pivoted member forming an arm pivot on which an intermediate section of said arm slides, so that rotation of the crank by the drive shaft causes the claw pin on the arm first to advance and then to move downwardly in a pull down path which is substantially the arc of a circle having a center on a center line of the movement determined by the center of rotation of the crank and the center of said arm pivot, and finally to retract and move through a return path spaced rearwardly from its pull-down path to reach the first position, said arm pivot and crank being so located and proportioned that at the beginning of the pull down path the arm makes an angle of approximately 25° with the center line of the movement, and curved film guide means for guiding a film in a curved film path just rearwardly of the pull down path of the forward end of said claw-pin, the center of curvature of said film guide means being located on the center line of the movement forward of the arm pivot center and between the center of the arm pivot and the center of curvature of the pull down path of the claw pin.

GORDON B. POLLOCK.